Nov. 13, 1923.

E. MOORE ET AL 1,473,637

HOPPLE

Filed Jan. 6, 1921

Inventors:
Edward Moore
& Sidney F. Welsh
By
Frank C. Curtis
Attorney

Patented Nov. 13, 1923.

1,473,637

UNITED STATES PATENT OFFICE.

EDWARD MOORE, OF COLONIE, AND SIDNEY F. WELSH, OF ELSMERE, NEW YORK.

HOPPLE.

Application filed January 6, 1921. Serial No. 435,530.

*To all whom it may concern:*

Be it known that we, EDWARD MOORE, a citizen of the United States, resident of Colonie, county of Albany, and State of New York, and SIDNEY F. WELSH, a citizen of the United States, resident of Elsmere, county of Albany, and State of New York, have invented new and useful Improvements in Hopples, of which the following is a specification.

Reference may be had to the accompanying drawings, and the reference characters marked thereon, which form a part of this specification. Similar characters refer to similar parts in the several figures therein.

This invention relates to hopples for restricting the movements of the legs of various animals, and is particularly adapted for hoppling cows while they are being milked.

The principal object of the invention is to prevent injury, and so far as possible, to avoid discomfort to the cow, while facilitating the application and securing of the device to the cow's hind legs.

Other objects will appear in connection with the following description.

Fig. 1 of the drawings is a view in perspective showing a hopple embodying our invention.

Figure 1:
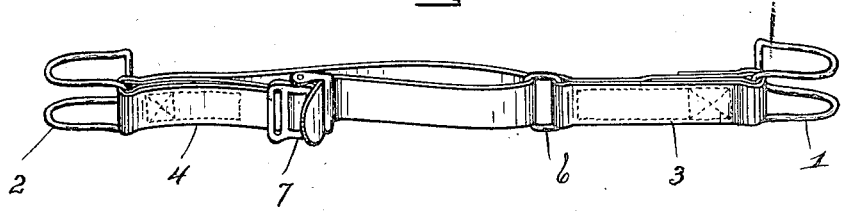

Referring to the drawings wherein the invention is shown in preferred form, our improved hopple comprises a pair of shackles, 1, 2, adjustably connected together by means of strap-members, 3 and 4.

Figure 2:
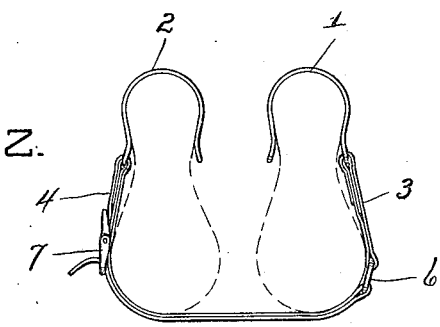
Fig. 2 is a top plan view of the hopple illustrating the manner in which the same is applied to the cow's hind legs.
Figure 3:
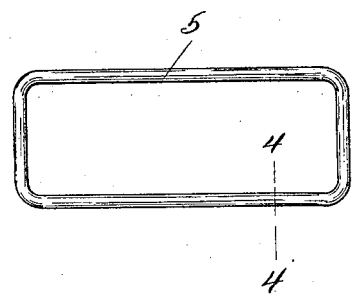
Fig. 3 is a plan view of an elongated metal loop before the same is bent to U-form in making a shackle for the hopple.
Figure 4:
Fig. 4 is a cross section of the same taken on the broken line 4—4 in Fig. 3.

Each of the shackles is formed from an elongated loop, 5, of metal circular in cross section, which loop is bent to substantially U-form with its ends somewhat divergent as shown in Fig. 2.

The strap-members, 3 and 4, are preferably made of flat webs of canvas or other material which is not likely to injure the legs of the animal to which the hopple is applied.

The strap-member, 3, is attached at one end to one end of the shackle, 1, and has attached to its other end an eye, 6.

The strap-member, 4, is attached at one end to one end of the shackle, 2, and has attached to its intermediate portion a buckle, 7, the strap-member extending beyond the buckle through the eye, 6, and back through the buckle with which it makes an adjustable connection in the usual manner of connecting straps with buckles. The buckle may be of any known form.

The strap-members being made of flat webs of canvas or the like present wide flat surfaces to the legs of the animal wherever contacting with the same, while the shackles formed in the manner above described present to the legs of the animal each two separated circularly curved surfaces extending on opposite sides of and behind each hind leg. The ends of the shackles being divergent as shown, flare away from the fleshy portions of the legs so as not to injure or unduly confine the same.

In applying the hopple the shackles are placed over the ham strings and the slack in the strap-member, 3—4, is taken up by drawing the end of the strap-member, 4, through the buckle until the legs of the animal are brought together to the desired degree in which position the strap-member, 4, is fastened by the buckle.

By passing the strap-member through the eye, 6, before passing it through the buckle a leverage is provided which permits the operator to draw the legs of the animal together while using but slight force.

The only surfaces of the hopple which can make contact with the legs of the animal are flat canvas surfaces or rounded metal surfaces so that the tendency to injure or cause discomfort is reduced to a minimum.

What we claim as new and desire to secure by Letters Patent is—

A hopple comprising a pair of shackles severally formed of an elongated loop of metal of U-shape circular in cross section, a flat canvas strap-member attached at one end to one end of one of the shackles and having at its other end an eye, and another flat canvas strap-member attached to one end of the other shackle, said latter strap-member having a buckle and being extended beyond the buckle through said eye and back through the buckle with which it makes adjustable connection.

EDWARD MOORE.
SIDNEY F. WELSH.